United States Patent
Eriksson

(10) Patent No.: US 12,354,479 B2
(45) Date of Patent: Jul. 8, 2025

(54) METHOD FOR PREVENTING A COLLISION OF A VEHICLE WITH ANOTHER ROAD USER, COLLISION WARNING SYSTEM, AND VEHICLE

(71) Applicant: Volvo Car Corporation, Gothenburg (SE)

(72) Inventor: Alexander Eriksson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 195 days.

(21) Appl. No.: 18/157,338

(22) Filed: Jan. 20, 2023

(65) Prior Publication Data

US 2023/0237913 A1 Jul. 27, 2023

(30) Foreign Application Priority Data

Jan. 24, 2022 (EP) .................................... 22153001

(51) Int. Cl.
*G08G 1/16* (2006.01)
*H04B 17/318* (2015.01)
(Continued)

(52) U.S. Cl.
CPC ............ *G08G 1/166* (2013.01); *G08G 1/167* (2013.01); *H04B 17/318* (2015.01);
(Continued)

(58) Field of Classification Search
CPC ........ G08G 1/166; G08G 1/167; G08G 1/163; H04B 17/318; H04W 4/027; H04W 4/40; H04W 4/90; H04W 4/023
See application file for complete search history.

(56) References Cited

U.S. PATENT DOCUMENTS

2007/0085657 A1* 4/2007 Ogino ................ G07C 9/00309
340/5.72
2012/0310447 A1* 12/2012 Toki ........................ B60R 25/24
701/2
(Continued)

FOREIGN PATENT DOCUMENTS

WO 2004047047 A1 6/2004

OTHER PUBLICATIONS

Extended EP Search Report for EP Application No. 22153001.7 dated Jul. 19, 2022.

*Primary Examiner* — Russell Frejd
*Assistant Examiner* — Ana D Thomas
(74) *Attorney, Agent, or Firm* — Amin, Turocy & Watson, LLP

(57) ABSTRACT

The disclosure relates to a method for preventing a collision of a vehicle with another road user carrying a mobile electronic device. The method comprises receiving identification data from the mobile electronic device at a receiving unit of the vehicle. Thereafter, a position of the mobile electronic device is calculated based on a signal strength of the signal carrying the received identification data. Subsequently, a collision risk of the road user carrying the mobile electronic device and the vehicle is determined. If a collision risk is determined, a warning activity for a user of the vehicle is triggered. The disclosure additionally relates to a collision warning system comprising a receiving unit for receiving identification data from a mobile electronic device and a data processing device. The data processing device is communicatively coupled to the receiving unit. Moreover, the data processing device comprises means for calculating a position of the mobile electronic device, for determining the collision risk, and for triggering a warning activity for a
(Continued)

user of the vehicle. Furthermore, a vehicle having such a collision warning system is presented.

20 Claims, 2 Drawing Sheets

(51) Int. Cl.
  *H04W 4/02* (2018.01)
  *H04W 4/40* (2018.01)
  *H04W 4/90* (2018.01)
(52) U.S. Cl.
  CPC ............. *H04W 4/027* (2013.01); *H04W 4/40* (2018.02); *H04W 4/90* (2018.02)

(56) References Cited

U.S. PATENT DOCUMENTS

| | | |
|---|---|---|
| 2013/0127638 A1 | 5/2013 | Harrison |
| 2018/0090005 A1* | 3/2018 | Philosof ................. G08G 1/164 |
| 2018/0105107 A1* | 4/2018 | Hassan-Shafique ... G08G 1/164 |
| 2021/0287529 A1* | 9/2021 | Beauchamp ........... G08G 1/161 |
| 2023/0180183 A1* | 6/2023 | Vassilovski ............. H04W 4/90 |
| | | 455/452.1 |

* cited by examiner

METHOD FOR PREVENTING A COLLISION OF A VEHICLE WITH ANOTHER ROAD USER, COLLISION WARNING SYSTEM, AND VEHICLE

BACKGROUND

The present disclosure relates to a method for preventing a collision of a vehicle with another road user.

Moreover, the present disclosure relates to a collision warning system and a vehicle comprising a collision warning system.

Collisions between a vehicle, for example a car or a truck, and another road user often happen in urban traffic situations.

In one such traffic situation, the vehicle is turning around a corner. In another such situation, the vehicle is parked and a user of the vehicle opens a side door.

These situations have in common that it is difficult for a user of the vehicle, be it the driver or a passenger, to visually check the road space adjacent to the vehicle for other road users. In a case in which the user of the vehicle uses a side mirror to check this road space, it is not possible to see other road users being in the dead angle region. The same applies for other road users being in a region which is not observable by the side mirror.

The other road user may be a pedestrian, a cyclist, a motorcyclist or any other vehicle. More generally the other road user may be a vulnerable road user (VRU).

SUMMARY

It is an objective of the present disclosure to prevent such collisions.

The problem is at least partially solved or alleviated by the subject matter of the independent claims of the present disclosure, wherein further examples are incorporated in the dependent claims.

According to a first aspect, there is provided a method for preventing a collision of a vehicle with another road user. The road user carries a mobile electronic device. The method comprises:

receiving identification data from the mobile electronic device at a receiving unit of the vehicle, calculating a position of the mobile electronic device based on a signal strength of the signal carrying the received identification data, determining a collision risk of the road user carrying the mobile electronic device and the vehicle based on the calculated position, and triggering a warning activity for a user of the vehicle if a collision risk is determined.

The method uses the fact that nowadays nearly every road user carries a mobile electronic device, e.g. a mobile phone, a smart phone, a smart watch, a tablet or any other wearable or portable mobile electronic device. Such mobile electronic devices usually broadcast identification data. The identification data may for example relate to an identification code or identification string of a transmitter chipset, a MAC address or a so-called fingerprint. In simplified words, these devices usually broadcast their ID. The identification data may be broadcasted constantly or with a certain repetition rate. A receiving unit of the vehicle is able to receive this identification data and thus is able to detect mobile electronic devices in the vicinity of the vehicle. It is noted that a specific identification code or identification string does not need to be captured or stored by the receiving unit. It is sufficient that the receiving unit detects broadcasted identification data as such. In the context of the present disclosure, the identification data is received in a wireless manner.

A position of the mobile electronic device can be calculated by simply evaluating the signal strength of the signal carrying the received identification data. This signal strength is associated with the mobile electronic device from which the identification data is received. The signal strength may be expressed in decibel (dB). In this context, the signal strength may for example be transformed into a position or proximity measure by multiplying the signal strength with a defined factor. It is also possible to define signal strength intervals and corresponding position spaces. Thus, if a signal strength falls within one of the defined signal strength intervals, it is assumed that the corresponding mobile electronic device is located in the corresponding position space.

Following this part of the method, it is possible to determine if there is a risk that the other road user collides with the vehicle. To this end, a proximity threshold may be defined and if the calculated position is closer to the vehicle than the defined proximity threshold, it is assumed that there is a collision risk. In a case in which position spaces are defined, a collision risk may be attributed to a subset of the position spaces. Accordingly, no collision risk may be attributed to other position spaces.

In an example, the collision risk is binary, i.e. it is either present or absent.

Subsequently, a warning activity is triggered. This means that a signal is provided to an entity being able to perform a warning activity. Caused by the signal, this entity performs the warning activity which may be any type of warning that can be perceived by a user of the vehicle, e.g. an acoustic warning, a visual warning or a haptic warning. In this context, the warning activity may be performed by the same entity on which the method for preventing a collision of a vehicle with another road user is performed or by an entity being separate therefrom. In any case, the warning activity has the objective to make the user of the vehicle double-check the surroundings before continuing his/her current activity, e.g. opening the door or turning around a corner.

The method according to the present disclosure may be performed in a simple and reliable manner. Since omnipresent mobile electronic devices are used, the method may be performed without the need for expensive installations such as radar units or ultrasound units. Moreover, the method may be performed in a very energy-efficient manner since just a receiving unit of the vehicle is necessary which passively listens to broadcasted identification data. The receiving unit may be specifically used for performing the method of the present disclosure. Alternatively, the receiving unit may also be used for other purposes within the vehicle.

In an example, an ultra wideband communication protocol, a Bluetooth communication protocol or any other communication protocol may be used for receiving the identification data at the receiving unit. In such a case, the receiving unit comprises an ultra wideband receiver or a Bluetooth receiver respectively.

It is noted that the method according to the present disclosure is suitable for preventing collisions of any kind. In an example, the method is configured for preventing collisions of a side of the vehicle with another road user. This example is based on the finding that in situations like turning around a corner or opening a door of the vehicle, the space adjacent to the side of the vehicle may be difficult to observe. The method of the present disclosure mitigates or solves this problem. Additionally or alternatively, the method may be configured for preventing a collision of a front of the vehicle with another road user and/or a collision of a rear of the vehicle with another road user.

In an example, the method may comprise listening to broadcasted identification data from mobile electronic devices in a vicinity of the vehicle. In the present context, listening to broadcasted identification data may also be described as sampling or collecting broadcasted identification data. This is a simple and energy-efficient manner of receiving identification data from a mobile electronic device. The receiving unit may listen constantly or periodically. In a case in which the receiving unit captures, i.e. at least temporarily stores, the identification data of a mobile electronic device being attributed to the received identification data, it is also possible to just periodically check for new mobile electronic devices. If such a check has the result that no new mobile electronic device is detected, the method may be abandoned. In case a new mobile electronic device is detected, the corresponding collision risk is determined and if necessary a warning activity is triggered. Consequently, mobile electronic devices may be detected with high reliability.

In an example, receiving identification data may comprise receiving the identification data at at least two separate receiving units of the vehicle. This enhances the reliability and stability of the method. In this context, it is possible to abandon the method if identification data is received by one receiving unit only. Thus, the method is only performed if at two or more receiving units identification data is received. In other words, the method is only performed if a mobile electronic device is detected in the vicinity of the vehicle with high certainty. Of course, it is also possible to use more than two separate receiving units at which the identification data is received.

In an example, calculating a position of the mobile electronic device comprises applying a triangulation technique to the received identification data. To this end, it is necessary to receive the identification data at at least two separate receiving units having a known distance. Moreover, the angles of reception need to be known or measured. Using the triangulation technique, a position of the mobile electronic device can be calculated with high precision. The triangulation technique is facilitated if an identification code or identification string of the mobile electronic device is at least temporarily stored by a memory unit of the receiving unit. It is noted that for data privacy reasons, the identification code or identification string may be deleted from the memory unit of the receiving unit once the triangulation has been terminated. At this point, the identification code or identification string is not needed any more. Moreover, applying a triangulation technique is computationally efficient. Thus, the position can be calculated within a comparatively short time.

In an example, determining the collision risk may comprise calculating a velocity of the mobile electronic device and/or a direction of travel of the mobile electronic device. This can be done by calculating two distinct positions of the same mobile electronic device and by evaluating a distance between these two distinct positions in terms of space and time. On this basis, the collision risk may be determined with enhanced precision.

In an example, determining the collision risk may comprise assessing whether the mobile electronic device approaches the vehicle. Alternatively or additionally, determining the collision risk may comprise assessing whether a velocity of the mobile electronic device exceeds a defined velocity threshold. In this context, a collision risk may be excluded if the mobile electronic device departs from the vehicle. Moreover, a collision risk may be excluded if the velocity of the mobile electronic device is below the defined velocity threshold. In other words, a collision risk can be determined with high certainty.

According to an example, the defined velocity threshold may depend from a distance between the mobile electronic device and the vehicle. At a distance further away from the vehicle, the defined velocity threshold may be higher than at a distance closer to the vehicle. Thus, the collision risk can be determined with high accuracy.

In an example, the presence of a collision risk may be determined if the mobile electronic device approaches the vehicle and the velocity of the mobile electronic device exceeds the defined velocity threshold. Thus, the collision risk may be determined with high reliability and precision.

In an example, triggering a warning activity may comprise at least one of:
- triggering an optical warning message to be displayed on a display unit within the vehicle,
- triggering an acoustic warning message to be produced by a speaker unit within the vehicle, and
- triggering a blind spot warning system to perform a warning activity.

In this context, a warning activity being performed by the blind spot warning system may be optical or acoustic or both. In all of the above alternatives, the warning activity may be performed by an entity being specifically provided for performing the method according to the present disclosure. Alternatively, entities of the vehicles may be used that also serve another purpose. For example, a display unit of a central instrument cluster, entertainment system, navigation system, etc. may be used to display an optical warning message. According to another example, a speaker of an entertainment system may be used to deliver an acoustic warning message. In any case, a user of the vehicle is effectively warned and is thus in a position to prevent a collision of the vehicle with another road user.

In an example, receiving identification data from the mobile electronic device may comprise receiving the identification data at a receiving unit of a keyless opening module of the vehicle. It is noted that also keyless opening modules cooperate with a kind of a key. These systems are called keyless because it is not necessary to actively use the key for opening the vehicle. The key may be a key fob being configured for sending a radio signal to the keyless opening module. Alternatively, the keyless opening module may be configured as a so-called phone-as-key system. In this case, a mobile phone acts as the key. Since the keyless opening module of the vehicle may already be present in the vehicle, the method according to the present disclosure does not require the installation of an additional receiving unit. Thus, the method can be performed in a simple manner. Moreover, standard keyless opening modules comprise more than one receiving unit. Consequently, when using the receiving units of a keyless opening module, a triangulation technique can be applied for calculating the position of the mobile electronic device.

In an example, the method may be performed if the vehicle is in a parked state. An additionally condition for performing the method according to the present disclosure may be that the vehicle is turned off. In this configuration, the method is specifically adapted for preventing a collision between an opening side door of the vehicle and the other road user.

In an example, the method may be performed if the vehicle is in a driving state and a turn indicator of the vehicle is active. In this configuration, the method is specifically adapted for preventing a collision between a side of the vehicle and the other road user in a situation in which the vehicle is turning around a corner.

In a further example, in which the method may be performed if the vehicle is in a driving state and a turn indicator of the vehicle is active, a brake system may be actuated if a collision risk is determined. This means that the vehicle automatically decelerates or stops in case of a detected collision risk. Thus, a collision is prevented with high reliability.

According to a second aspect, there is provided a collision warning system comprising a receiving unit for receiving identification data from a mobile electronic device and a data processing device. The data processing device is communicatively coupled to the receiving unit. Moreover, the data processing device comprises means for calculating a position of the mobile electronic device based on a signal strength of the signal carrying the received identification data, determining a collision risk of the road user carrying the mobile electronic device and the vehicle based on the calculated position, and triggering a warning activity for a user of the vehicle if a collision risk is determined.

Such a collision warning system leads to a reliable prevention of collisions between the vehicle and another road user.

In an example, the receiving unit is a receiving unit of a keyless opening module of the vehicle. Thus, the collision warning system does not require a separate receiving unit. In other words, the receiving unit of the keyless opening module serves two purposes, the collision warning system and the keyless opening module. The collision warning system can, thus, be implemented in a vehicle at comparatively low costs.

In an example, the collision warning system may comprise at least two receiving units of the keyless opening module of the vehicle. Consequently, a position of the mobile electronic device may be calculated with high accuracy. Furthermore, the application of a triangulation technique for calculating the position of the mobile electronic device is possible.

In an example, the data processing device may comprise an output interface for communicating with a warning system. Consequently, the warning system may be triggered in a reliable and efficient manner to perform a warning activity.

According to a third aspect, there may be provided a vehicle having a collision warning system according to the present disclosure. Thus, when using such a vehicle collisions between the vehicle and another road user are reliably prevented.

According to a fourth aspect, there may be provided a computer program comprising instructions which, when the program is executed by a computer, cause the computer to carry out the method of the present disclosure.

According to a fifth aspect, there may be provided a computer-readable storage medium comprising instructions which, when executed by a computer, cause the computer to carry out the method of the present disclosure.

The method may be at least partly computer-implemented, and may be implemented in software or in hardware, or in software and hardware. Further, the method may be carried out by computer program instructions running on means that provide data processing functions. The data processing means may be a suitable computing means, such as an electronic control module etc., which may also be a distributed computer system. The data processing means or the computer, respectively, may comprise one or more of a processor, a memory, a data interface, or the like.

It should be noted that the above examples may be combined with each other irrespective of the aspect involved. Accordingly, the method may be combined with structural features of the collision warning system and, likewise, the collision warning system may be combined with features described above with regard to the method.

The effects and advantages which have been mentioned in connection with the method according to the present disclosure also apply to the collision warning system and vice versa.

These and other aspects of the present disclosure will become apparent from and elucidated with reference to the examples described hereinafter.

BRIEF DESCRIPTION OF THE DRAWINGS

Examples of the disclosure will be described in the following with reference to the following drawings.

The figures are merely schematic representations and serve only to illustrate examples of the disclosure. Identical or equivalent elements are in principle provided with the same reference signs.

DETAILED DESCRIPTION

Figure 1:
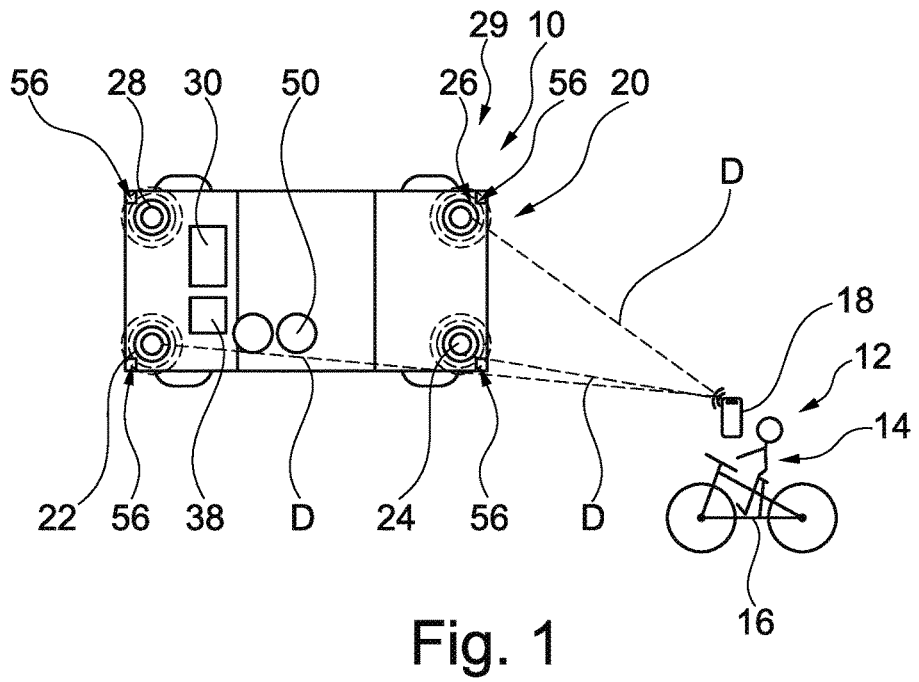
FIG. 1 shows a vehicle according to the present disclosure comprising a collision warning system according to the present disclosure which is able to perform a method for preventing a collision of the vehicle with another road user according to the present disclosure, and another road user, FIG. 2 schematically shows the collision warning system of FIG. 1.

FIG. 1 shows a vehicle 10 and another road user 12.

In the present example, the vehicle 10 is a car and the other road user 12 is a cyclist 14. It should be noted that the term "road user" may also refer to a pedestrian or a driver of other vehicles, e.g. a scooter.

The cyclist 14 rides a bicycle 16 and carries a mobile electronic device 18 which is a mobile phone in the example shown in the figure.

The vehicle 10 comprises a collision warning system 20.

The collision warning system 20 comprises a total of four receiving units 22, 24, 26, 28. These receiving units 22, 24, 26, 28 are parts of a so-called keyless opening module 29 of the vehicle 10.

This means that the receiving units 22, 24, 26, 28 are configured for receiving a radio signal from a key fob or mobile phone acting as a key for opening the vehicle.

Moreover, the receiving units 22, 24, 26, 28 are configured for receiving identification data D from the mobile electronic device 18.

It is noted that the mobile electronic device 18 does not act as a key for the keyless opening module 29 of the vehicle 10.

Moreover, the collision warning system 20 comprises a data processing device 30.

Figure 2:
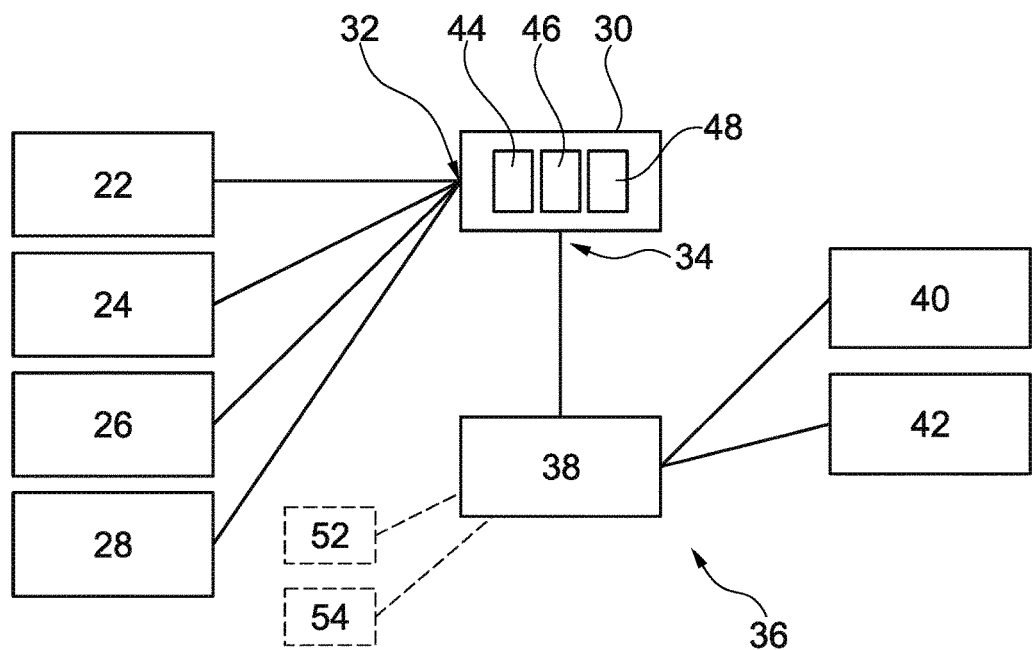

The data processing device 30 comprises an input interface 32 through which it is communicatively coupled to the receiving units 22, 24, 26, 28 (see also FIG. 2).

Additionally, the data processing device 30 comprises an output interface 34 for communicating with a warning system 36.

In the present example, the data processing device 30 is communicatively coupled to the warning system 36 via the output interface 34. The warning system 36 comprises a display control unit 38 and two display units 40, 42 which form part of a central instrument cluster of the vehicle 10.

The data processing device 30 comprises means 44 for calculating a position of the mobile electronic device 18. These means can also be called a position calculation unit 44. For the ease of explanation, the same reference sign will be used for the means 44 for calculating a position of the mobile electronic device 18 and the position calculation unit 44.

Additionally, the data processing device 30 comprises means 46 for determining a collision risk of the road user 12 carrying the mobile electronic device 18 and the vehicle 10. These means 46 can also be called a collision risk determination unit 46. For the ease of explanation, the same reference sign will be used for the means 46 for determining a collision risk and the collision risk determination unit 46.

Furthermore, the data processing device 30 comprises means 48 for triggering a warning activity for a user 50 of the vehicle. These means 48 may also be called a trigger unit 48. For the ease of explanation, the same reference sign will be used for the means 48 for triggering a warning activity and the trigger unit 48.

Figure 3:
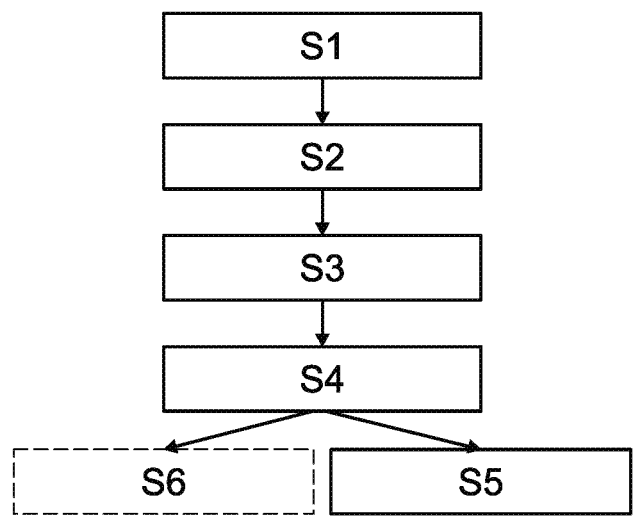
FIG. 3 illustrates the method for preventing a collision of a vehicle with another road user according to the present disclosure in a block diagram.
Figure 4:
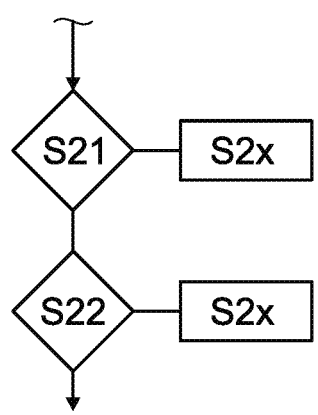
FIG. 4 illustrates a detail of the method for preventing a collision of a vehicle with another road user according to the present disclosure in a flow chart.

The collision warning system 20 may be used for performing a method for preventing a collision of the vehicle 10 with the road user 12 (cf. FIGS. 3 and 4).

In order to be able to perform the method, it is mandatory that the road user 12 carries the mobile electronic device 18 which is a mobile phone in the present example.

Moreover, the mobile electronic device 18 needs to be in a configuration in which it constantly or periodically broadcasts identification data D being attributed to an identification of the mobile electronic device 18. The broadcasted identification data D may comprise at least partially an identification code or identification string of the mobile electronic device 18. Additionally or alternatively, the broadcast identification data D may comprise a request to exchange such an identification code or identification string. The latter alternative is sufficient for performing the method.

In the following, a first example of the method will be explained.

In the first example, the vehicle 10 is in a parked state, i.e. not moving. A user 50 of the vehicle 10 is inside the vehicle 10 and intends to leave the vehicle 10.

In a first step S1, the receiving units 22, 24, 26, 28 passively listen to broadcasted identification data D from mobile electronic devices in a vicinity of the vehicle 10. As has already been mentioned before, the receiving units 22, 24, 26, 28 are receiving unit of a keyless opening module 29 of the vehicle 10.

In a second step S2, the receiving units 22, 24, 26 receive identification data D from the mobile electronic device 18.

It is noted that this is just an example. Depending on the position of the road user 12, also any other subset of the receiving units 22, 24, 26, 28 may receive identification data D from the mobile electronic device 18.

Subsequently, a first check S21 is performed, if the received identification data D is new, i.e. if the method has already been performed using the received identification data D.

If the received identification data D is not new, the method is abandoned (cf. S2x).

If the received identification data D is new, a second check S22 is performed. This check S22 consists in evaluating if the identification data D has been received at two or more receiving units 22, 24, 26, 28. If the identification data D has been received by one receiving unit 22, 24, 26, 28 only, the method is abandoned (cf. S2x). Otherwise, the method is continued.

In a third step S3, a position of the mobile electronic device 18 is calculated based on the signal strength of the signal carrying the received identification data D. This of course implies that the signal strength is evaluated using the data processing device 30. More precisely, the position calculation unit 44 is used to solve this task.

Additionally, a triangulation technique is used for calculating the position of the mobile electronic device 18. This is possible since the identification data D is received by three of the receiving units 22, 24, 26, 28 of the vehicle 10.

Subsequently, in a fourth step S4, a collision risk of the road user 12 carrying the mobile electronic device 18 and the vehicle 10 is determined.

In the present example, this is done by calculating a velocity of the mobile electronic device 18 and a direction of travel of the mobile electronic device 18. This may be performed by applying a triangulation technique a second time. In this context, the lapsed time between the first application of a triangulation technique for calculating the position of the mobile electronic device 18 and the second application of a triangulation technique needs to be known.

The outcome of the second application of a triangulation technique also is a position of the mobile electronic device 18.

The positions resulting from the two applications of the triangulation techniques may be compared and the resulting difference and the known time interval between the applications may be used for calculating the velocity and the direction of travel of the mobile electronic device 18.

It is assumed that the velocity of the mobile electronic device 18 and the direction of travel of the mobile electronic device 18 corresponds to the velocity of the road user 12 and the direction of travel of the road user 12.

Thereafter, it is assessed whether the mobile electronic device 18 approaches the vehicle 10. Moreover, it is assessed whether the velocity of the mobile electronic device 18 exceeds a defined velocity threshold.

A collision risk is determined only if the mobile electronic device 18 approaches the vehicle 10 at a velocity exceeding the defined velocity threshold.

If a collision risk has been found, a warning activity is triggered in a fifth step S5.

To this end, a signal is send from the data processing device 30 to the warning system 36.

More precisely, a signal is sent to the display control unit 38. As a consequence thereof, a visual warning message is displayed on display units 40, 42.

Thus, the user 50 is visually warned from opening the door. As a consequence thereof, the user 50 will either wait until the warning message is not displayed any more or will double check the surroundings of the vehicle 10 and open the door with utmost care.

In both cases, a collision of the opening door with the road user 12 is prevented.

It is noted that in other examples, the warning system 36 may be configured for issuing acoustic warning messages and thus in step S5 an acoustic warning message to be produced by a speaker unit 52 within the vehicle is triggered. In a further example, the vehicle 10 may comprises a blind spot warning system 54 and in step S5 the blind spot warning system 54 may be triggered to perform a warning activity, i.e. to deliver a warning message.

The method may also be used in accordance with a second example.

In the second example, the vehicle 10 is in a driving state, i.e. it is moving. Moreover, the vehicle 10 is turning around a corner and a turn indicator is active.

In the following, only the differences with the method according to the first example will be explained.

Steps S1 to S4 are performed in the same manner as has been explained in connection with the first example.

Step S5 is performed with the only difference that the warning message does not warn the user 50 of the vehicle 10 from opening the door. Rather, the warning message warns the user 50 of the road user 12 being in its way when performing the turn.

In addition thereto, in a step S6, which is only present in the second example, a brake of the vehicle 10 may be engaged automatically in order to decelerate or stop the vehicle 10.

Thus, also in the second example, a collision of the vehicle 10 with the road user 12 is prevented.

Other variations to the disclosed examples can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

LIST OF REFERENCE SIGNS 10 vehicle
12 road user
14 cyclist
16 bicycle
18 mobile electronic device
20 collision warning system
22 receiving unit
24 receiving unit
26 receiving unit
28 receiving unit
29 keyless opening module
30 data processing device
32 input interface
34 output interface
36 warning system
38 display control unit
40 display unit
42 display unit
44 means for calculating a position of the mobile electronic device, position calculation unit
46 means for determining a collision risk, collision risk determination unit
48 means for triggering a warning activity, trigger unit
50 user of the vehicle
52 speaker unit
54 blind spot warning system
56 turn indicator
D identification data
S1 method step
S2 method step
S21 first check
S22 second check
S2$x$ abandonment of the method
S3 method step
S4 method step
S5 method step
S6 method step

The invention claimed is:

1. A method for preventing a collision of a vehicle with another road user, wherein the road user carries a mobile electronic device, the method, comprising:
   receiving, by at least one processor, via at least one receiving unit of a plurality of separate receiving units of the vehicle, identification data from the mobile electronic device;
   determining, by the at least one processor, a position of the mobile electronic device based on a signal strength of a signal carrying the received identification data;
   determining, by the at least one processor, whether a collision risk exists between the road user carrying the mobile electronic device and the vehicle based on the position of the mobile electronic device; and
   triggering, by the at least one processor, a warning activity for a user of the vehicle in response to determining that the collision risk exists and determining that the identification data was received by more than one receiving unit of the plurality of separate receiving units of the vehicle.

2. The method of claim 1, wherein determining the position of the mobile electronic device comprises applying a triangulation technique to the received identification data.

3. The method of claim 1, wherein determining whether the collision risk exists comprises determining at least one of a velocity of the mobile electronic device or a direction of travel of the mobile electronic device.

4. The method of claim 3, wherein determining whether the collision risk exists further comprises at least one of determining whether the mobile electronic device is approaching the vehicle based on the direction of travel of the mobile electronic device, or determining whether the velocity of the mobile electronic device exceeds a defined velocity threshold.

5. The method of claim 4, wherein a presence of the collision risk exists if the mobile electronic device is approaching the vehicle and the velocity of the mobile electronic device exceeds the defined velocity threshold.

6. The method according to claim 1, wherein triggering the warning activity comprises at least one of:
   triggering an optical warning message to be displayed on a display unit within the vehicle,
   triggering an acoustic warning message to be produced by a speaker unit within the vehicle, or
   triggering a blind spot warning system to perform a warning activity.

7. The method of claim 1, wherein receiving the identification data from the mobile electronic device comprises receiving the identification data at a receiving unit of a keyless opening module of the vehicle.

8. The method of claim 1, wherein the method is performed in response to determining that the vehicle is in a parked state.

9. The method of claim 1, wherein the method is performed in response to determining that the vehicle is in a driving state and a turn indicator of the vehicle is active.

10. A collision warning system comprising:
a memory storing computer executable instructions; and
a processor the executes at least one of the computer executable instructions that:
receives, by at least one receiving unit of a plurality of separate receiving units of a vehicle, identification data from a mobile electronic device;
determines a position of the mobile electronic device based on a signal strength of a signal carrying the received identification data;
determines a collision risk of the road user carrying the mobile electronic device and the vehicle based on the position of the mobile electronic device; and
triggering a warning activity for a user of the vehicle in response to determining that the collision risk exists and determining that the identification data was received by more than one receiving unit of the plurality of separate receiving units of the vehicle.

11. The collision warning system of claim 10, wherein triggering the warning activity comprises at least one of:
triggering an optical warning message to be displayed on a display unit within the vehicle,
triggering an acoustic warning message to be produced by a speaker unit within the vehicle, or
triggering a blind spot warning system to perform a warning activity.

12. The collision warning system of claim 10, wherein at least one of the plurality of separate receiving units is a receiving unit of a keyless opening module of the vehicle.

13. The collision warning system of claim 10, wherein determining the position of the mobile electronic device comprises applying a triangulation technique to the received identification data.

14. The collision warning system of claim 10, wherein determining whether the collision risk exists comprises determining at least one of a velocity of the mobile electronic device or a direction of travel of the mobile electronic device.

15. The collision warning system of claim 14, wherein determining whether the collision risk exists further comprises at least one of determining whether the mobile electronic device is approaching the vehicle based on the direction of travel of the mobile electronic device, or determining whether the velocity of the mobile electronic device exceeds a defined velocity threshold.

16. A vehicle comprising:
a collision warning system, the collision warning system comprising:
a memory storing computer executable instructions; and
a processor the executes at least one of the computer executable instructions that:
receives, by at least one receiving unit of a plurality of separate receiving units of a vehicle, identification data from a mobile electronic device;
determines a position of the mobile electronic device based on a signal strength of a signal carrying the received identification data;
determines a collision risk of the road user carrying the mobile electronic device and the vehicle based on the position of the mobile electronic device; and
triggering a warning activity for a user of the vehicle in response to determining that the collision risk exists and determining that the identification data was received by more than one receiving unit of the plurality of separate receiving units of the vehicle.

17. The vehicle of claim 16, wherein determining the position of the mobile electronic device comprises applying a triangulation technique to the received identification data.

18. The vehicle of claim 16, wherein determining the position of the mobile electronic device comprises applying a triangulation technique to the received identification data.

19. The vehicle of claim 18, wherein determining whether the collision risk exists further comprises at least one of determining whether the mobile electronic device is approaching the vehicle based on the direction of travel of the mobile electronic device, or determining whether the velocity of the mobile electronic device exceeds a defined velocity threshold.

20. The vehicle of claim 16, wherein triggering the warning activity comprises at least one of:
triggering an optical warning message to be displayed on a display unit within the vehicle,
triggering an acoustic warning message to be produced by a speaker unit within the vehicle, or
triggering a blind spot warning system to perform a warning activity.

* * * * *